US008533665B2

(12) United States Patent
Yu et al.

(10) Patent No.: US 8,533,665 B2
(45) Date of Patent: Sep. 10, 2013

(54) GENERATING OBJECT ANNOTATIONS

(75) Inventors: Limin Yu, Sunnyvale, CA (US);
Inderpreet Bhullar, Fremont, CA (US);
Mukesh Garg, Fremont, CA (US)

(73) Assignee: Cisco Technology, Inc., San Jose, CA (US)

( * ) Notice: Subject to any disclaimer, the term of this patent is extended or adjusted under 35 U.S.C. 154(b) by 968 days.

(21) Appl. No.: 12/619,387

(22) Filed: Nov. 16, 2009

(65) Prior Publication Data
US 2011/0119652 A1    May 19, 2011

(51) Int. Cl.
*G06F 9/44* (2006.01)
(52) U.S. Cl.
USPC ........... 717/108; 717/107; 717/110; 717/111; 717/116; 717/118; 717/136; 717/137; 717/148; 717/153; 717/159
(58) Field of Classification Search
None
See application file for complete search history.

(56) References Cited

U.S. PATENT DOCUMENTS

| | | | |
|---|---|---|---|
| 7,921,415 B1 * | 4/2011 | Bodell et al. .................. | 717/139 |
| 8,145,794 B2 * | 3/2012 | Jethanandani et al. ....... | 709/246 |
| 8,291,230 B2 * | 10/2012 | Moore et al. .................. | 713/176 |
| 8,332,815 B2 * | 12/2012 | Balfe et al. .................... | 717/118 |
| 2007/0055964 A1 * | 3/2007 | Mirkazemi et al. ........... | 717/140 |
| 2008/0313648 A1 * | 12/2008 | Wang et al. ................... | 719/315 |
| 2009/0006454 A1 * | 1/2009 | Zarzar et al. .................. | 707/102 |
| 2009/0024986 A1 * | 1/2009 | Meijer et al. .................. | 717/137 |
| 2009/0193032 A1 * | 7/2009 | Pyper ............................. | 707/10 |
| 2009/0217150 A1 * | 8/2009 | Lin ................................ | 715/232 |
| 2010/0185862 A1 * | 7/2010 | Moore et al. .................. | 713/171 |
| 2010/0242018 A1 * | 9/2010 | Balfe et al. .................... | 717/118 |
| 2010/0269104 A1 * | 10/2010 | Woods .......................... | 717/147 |
| 2011/0170505 A1 * | 7/2011 | Rajasekar et al. ............ | 370/329 |
| 2011/0289140 A1 * | 11/2011 | Pletter et al. .................. | 709/203 |
| 2011/0289141 A1 * | 11/2011 | Pletter et al. .................. | 709/203 |
| 2011/0289425 A1 * | 11/2011 | Pletter et al. .................. | 715/744 |
| 2011/0289476 A1 * | 11/2011 | Pletter et al. .................. | 717/107 |
| 2011/0289479 A1 * | 11/2011 | Pletter et al. .................. | 717/122 |
| 2013/0097320 A1 * | 4/2013 | Ritter et al. .................... | 709/226 |

OTHER PUBLICATIONS

'Reading JSON Data With Dojo' from GeoChalkboard, published at geochalkboard.wordpress.com on Aug. 3, 2009.*
'JSON Refencing in Dojo' by Kris Zyp, Jun. 17, 2008.*
'The application/json Media Type for JavaScript Object Notation (JSON)' by D. Crockford, JSON.org, Jul. 2006.*
'The Prototype JavaScript Framework' by Rob Gravelle, published at webreference.com on Apr. 27, 2009.*
'Introducing JSON' from JSON.org, Nov. 1, 2009.*
Article on 'JSON' from Wikipedia.org, from Oct. 26, 2009.*
'Flexjson—JSON Serialization Usage' from flexjson.sourceforge. net, archived date Sep. 27, 2009.*
'Practical Palm Pre webOS Projects' Chapter 7, by Frank W. Zammetti, copyright 2009.*

* cited by examiner

*Primary Examiner* — Steven Snyder
(74) *Attorney, Agent, or Firm* — Hickman Palermo Truong Becker Bingham Wong LLP (57) ABSTRACT

A computer-implemented method is disclosed for generating Dojo-conforming JavaScript Object Notation (JSON) objects for base objects of an object-oriented programming environment that have been annotated to denote which attribute declarations of the base object correspond to identified Dojo attributes. In a Java class, for example, annotations may be made to indicate which class attributes correspond to the identifier attribute of a Dojo JSON object and based on those annotations a Dojo-conforming JSON object may be generated.

23 Claims, 3 Drawing Sheets

FIG. 2

GENERATING OBJECT ANNOTATIONS

TECHNICAL FIELD

The present disclosure generally relates to computer program application development and computer client-server communication techniques.

BACKGROUND

The approaches described in this section could be pursued, but are not necessarily approaches that have been previously conceived or pursued. Therefore, unless otherwise indicated herein, the approaches described in this section are not prior art to the claims in this application and are not admitted to be prior art by inclusion in this section.

In object-oriented computer program development, Rich Internet Application (RIA) architectures have recently become popular. An example of an RIA framework is Dojo, which is described at the Internet site dojotoolkit.org. In a Dojo based RIA architecture, RESTful web services act as the transport mechanism while JSON (JavaScript Object Notation) objects act as the data transfer object. "RESTful web services" refers to a web service implemented using HTTP and the principles of representational state transfer (REST), which is a style of software architecture for distributed hypermedia systems. JSON objects are described at the Internet site json.org.

JSON objects may be used to communicate object data from a JSON compatible server to clients such as those implemented using Dojo's RIA function libraries. However, Dojo also imposes other requirements on JSON objects to make them consumable directly by Dojo widgets. For example, Dojo widgets may require a JSON Object to contain a header instructing the widget how to map key pieces of its internal data to JSON attributes. Additionally, Dojo may expect the name of the first collection object in the JSON object to be named "items" and the names of any collection objects further down the hierarchy of the JSON object to be named "children." Hence, generic JSON objects that do not meet these additional requirements cannot be consumed by Dojo widgets.

DETAILED DESCRIPTION

Generating Dojo-conforming JavaScript Object Notation (JSON) objects is described. In the following description, for the purposes of explanation, numerous specific details are set forth in order to provide a thorough understanding of the present invention. It will be apparent, however, to one skilled in the art that the present invention may be practiced without these specific details. In other instances, well-known structures and devices are shown in block diagram form in order to avoid unnecessarily obscuring the present invention.

Embodiments are described herein according to the following outline:
  1.0 General Overview
  2.0 Structural and Functional Overview
  3.0 Generating Dojo-Conforming JavaScript Object Notation Objects
    3.1 Obtaining and Storing Annotations
    3.2 Generating the JSON Object
    3.3 Retrieving the Annotations
    3.4 Generating the JSON Header
    3.5 Modifying the JSON Object
  4.0 Implementation Mechanisms—Hardware Overview
  5.0 Extensions and Alternatives
  1.0 General Overview Generating Dojo-conforming JavaScript Object Notation (JSON) objects is described. In an embodiment, a computer-implemented method includes obtaining and storing one or more annotations that denote, as a JSON attribute, one or more attribute declarations of a base object of an object-oriented programming environment.

In some embodiments, the computer-implemented method may also include, generating a JSON object based upon a base object at runtime of an executable computer program that has been created using the base object. Additionally, the computer-implemented method may include retrieving the annotations, creating a JSON header that comprises the annotations in a format compatible with a function library that expects name-value pair declarations, and attaching the JSON header to the JSON object, in some embodiments. In some embodiments, the JSON object may be modified to include an items attribute.

In other embodiments, a computer apparatus and a computer-readable medium are provided.

2.0 Structural and Functional Overview

Certain generic frameworks can transform other types of objects to JSON objects. As generic frameworks, they generate generic JSON objects, which conform to the JSON standard. For example, GSON, one of widely used JSON framework from Google, only generates standard JSON objects. However, if a standard JSON object is compared to a Dojo-conforming JSON object, there may be structural differences between these two objects that may make one unusable within the Dojo API without additional processing.

Currently, generating Dojo-conforming JSON objects may be accomplished by writing boilerplate code either at the server or client side to manipulate either the source objects or the generated JSON objects manually to make them Dojo Data Store compliant. However, the problem with this practice is that each Dojo developer may have to make modifications to object source code which may incur an increase in production costs and a reduction in product quality.

Figure 1:
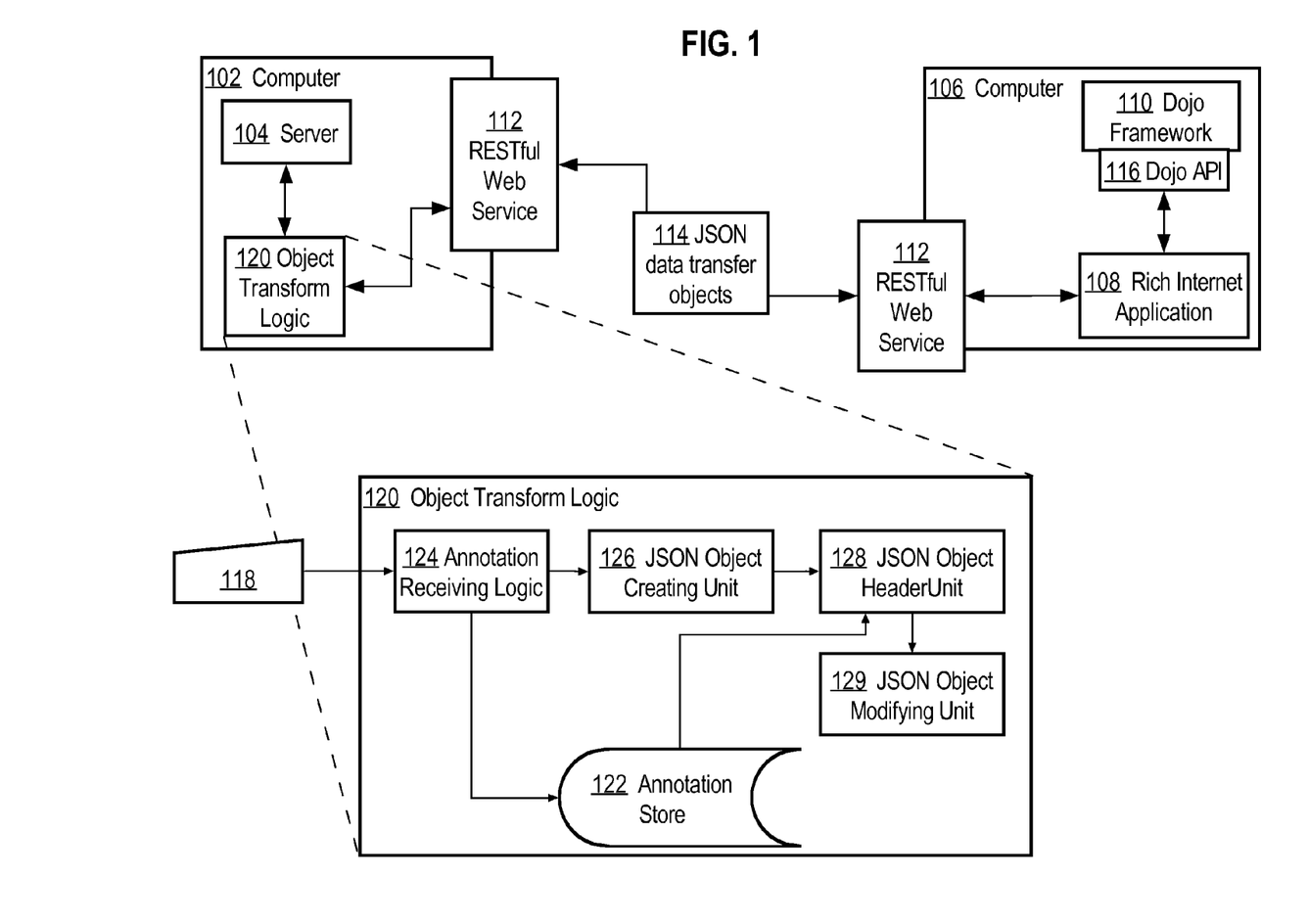
FIG. 1 illustrates a computer system that may be used to implement embodiments involving the use of JavaScript Object Notation ("JSON") objects in a Dojo-based Rich Internet Application (RIA) architecture.

FIG. 1 illustrates a computer system that may be used to implement embodiments involving the use of JSON objects in a Dojo-based Rich Internet Application (RIA) architecture. A computer 102 hosts a server 104, and in an embodiment the server is built using the Java programming environment. Alternatively, server 104 may be implemented using C#, .Net, or any other object-oriented programming environment. A second computer 106 hosts a Rich Internet Application 108, which uses the Dojo framework 110 interfaced using a Dojo API 116. The application 108 may need to communicate with the server 104. In an embodiment, RESTful web service 112 may act as a transport for communications between the server 104 and the application 108, and JSON objects 114 may act as data transfer objects.

Computer 102 further comprises object transform logic 120, coupled to the RESTful web service 112 and server 104.

The object transform logic 120 is configured to transform JSON objects into Dojo-compatible objects using the logic and functions that are further described herein. In an embodiment, object transform logic 120 comprises annotation receiving logic 124 coupled to a user input device 118 and to a JSON object creating unit 126. The annotation receiving logic 124 is configured to receive annotations of objects from the user input device 118 and to store the annotations in annotation store 122, which may comprise main memory, non-volatile memory, one or more disk storage units, or one or more other storage devices. The JSON object creating unit 126 is configured to create JSON objects and is coupled to a JSON object header unit 128, configured to create JSON object headers. A JSON object modifying unit 129 is coupled to unit 128 and comprises logic configured to modify header values and other aspects of Dojo-compatible JSON objects as further described.

For the server 104 to communicate with the application 108 using JSON objects 114, the JSON objects should conform to the Dojo API 116. For example, a basic unit of the dojo.data API is termed an item, which is composed of key/value pairs called attributes and attribute values in dojo.data parlance. Additionally, ItemFileReadStore is the basic infrastructure component provided by the Dojo toolkit, which is built around the concept of an Item and acts as the model object driving most Dojo widgets. JSON objects conforming to the specific format required by the dojo.data API can be consumed directly by Dojo widgets. For example, a JSON object targeting a dojo ComboBox graphical user interface (GUI) widget may contain a JSON header that defines, for the widget, which field within the JSON object provides an item value and which field provides an item label.

Dojo framework 110 may call for JSON objects 114 to contain a JSON header instructing a widget in the Dojo framework how to map internal data elements to JSON attributes. Additionally, Dojo framework 110 may call for the name of the first collection object in a JSON object to be named "items" and the names of any collection objects further down the hierarchy of the JSON object to be named "children."

In one embodiment, processes are configured for converting JSON objects into Dojo-conforming JSON objects, while interoperating with JSON and Dojo.

3.0 Generating Dojo-Conforming Json Objects

Embodiments relate to object annotations and a processing method or special-purpose computing devices configured to perform object transformations based on the annotations. Embodiments are operable as a JSON converter or as a post-processor to a JSON library.

3.1 Obtaining and Storing Annotations

Figure 2:
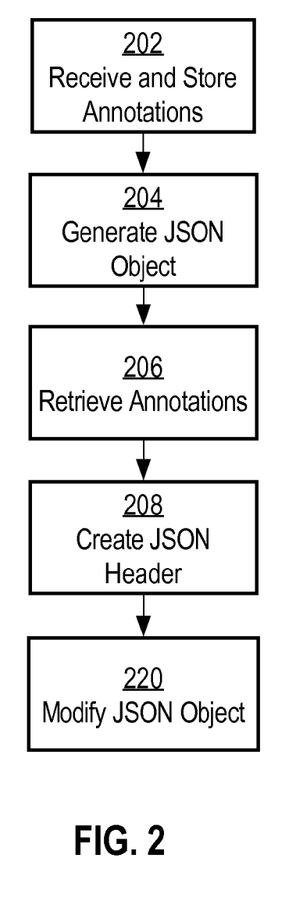
FIG. 2 illustrates an example process of performing object transformation.

FIG. 2 illustrates an example process of performing object transformation. In an embodiment, at step 202, annotations are received and stored. For example, a user prepares text-based annotations using input device 118 while viewing a listing or other display of a base object class definition, and communicates the annotations to annotation receiving logic 124, which stores the annotations in annotation store 122. According to some embodiments, obtaining and storing annotations may include receiving and storing class definitions of an object-oriented programming environment, including receiving and storing each annotation in association with a corresponding attribute declaration statement of the classes.

In an embodiment, annotations are made to class definitions of base objects of an object oriented programming environment that indicate which attribute declarations within the class correspond to JSON attributes of by a Dojo function library. For example, in the Java programming environment, a Java class may declare class attributes. Some of these attributes may be annotated to indicate that the attribute corresponds to a specific Dojo attribute. In some embodiments, the object oriented programming environment may be different than Java, such as .NET, C#, SmallTalk, Objective-C, C++ or any other object oriented programming environment.

As one example, Java class object annotations may be implemented through the use of Java interfaces as shown in the code excerpt of TABLE 1. TABLE 1, and all other TABLES 2-9 in this disclosure, are provided to clearly illustrate examples of various techniques, but the techniques herein also encompass variations and alternatives and are not limited to the particular examples that are given in the tables. Thus, the tables represent possibilities but not the only approaches for implementation.

TABLE 1

```
/**
 * Used to annotate the JSON 'identifier' attribute.
 * fieldName is used to manually set value of 'identifier'.
 */
@Target({FIELD, METHOD, CLASS})
@Retention(RetentionPolicy.RUNTIME)
@Documented
public @interface JsonIdentifier {
    String fieldName( );
}
/**
 * Used to annotate the JSON 'label' attribute.
 * fieldName is used to manually set the value of 'label'.
 */
@Target({FIELD, METHOD, CLASS})
@Retention(RetentionPolicy.RUNTIME)
@Documented
public @interface JsonLabel {
    String fieldName( );
}
```

In TABLE 1, the fieldname( )interface method may be implemented to indicate which attribute of the Java class corresponds to the JSON identifier attribute and the JSON label attribute that may be used by the Dojo function library. Hence, in an embodiment, a JSON object may be made into a Dojo-conforming object by providing code invoking the fieldname( )method of the JsonIdentifier and JsonLabel interfaces.

As a second example, Java class annotations may be implemented by annotating Java class attribute declarations as shown in TABLE 2.

TABLE 2

```
/**
 *   Details of a device
 **/
public class Device {
    @JsonIdentifier
    private String oid;
    @JsonLabel
    private String deviceName
    private String type;
    private String ip;
    [other declarations or code]
}
```

In the example of TABLE 2, the @JsonIdentifier and @JsonLabel annotations may be made inline with the Java class attribute declarations. For example, the @JsonIdentifier annotation may be made immediately before the declaration of the 'oid' class attribute. Thus, as discussed below, the JSON identifier attribute may be associated with and correspond to the oid class attribute. Similarly, the @JsonLabel attribute may be made immediately before the declaration of the 'deviceName' class attribute so that the JSON 'label' attribute may be associated with and correspond to the deviceName class attribute.

As a third example, Java class annotations may be implemented by annotating Java class object method declarations as shown in TABLE 3.

TABLE 3

```
/**
 * Details of a device
 **/
    public class Device {
    private String oid;
    private String deviceName
    private String type;
    private String ip;
    @JsonIdentifier
    public String getOid( ) {...};
    @JsonLabel
    public String getDeviceName( ) {...};
    [other declarations or code]
}
```

In the example of TABLE 3, the @JsonIdentifier and @JsonLabel annotations may be made inline with the Java class method declarations. For example, the @JsonIdentifier annotation may be made substantially immediately before the declaration of the 'getOid( )' class method. Thus, the JSON identifier attribute may be associated with and correspond to a value returned by an invocation of the 'getOid( )' method. Similarly, the @JsonLabel attribute may be made immediately before the declaration of the 'getDeviceName( )' class method so that the JSON 'label' attribute may be associated with and correspond to the value returned by an invocation of the 'getDeviceName( )' class method.

The code segments referred to above are merely illustrative and should not be construed as limitations on the concepts discussed herein as there are many different ways to annotate class objects in accordance with the embodiments discussed herein. Further, as previously indicated, the embodiments discussed are not limited to a Java programming environment implementation as the annotations discussed above may be made to objects of any object oriented programming environment.

Additionally, at step 202, obtaining and storing an embodiment may include receiving and storing a configuration file that includes a class name, and one or more tags, each tag associating a name of a class attribute used in the class with a JSON attribute. In some embodiments, annotations to object attribute declarations may be made using various configuration mechanisms. For example, annotations may be made in property files, XML files, a registry or other types of configuration mechanisms. An example of annotations in an XML configuration file may include the XML segment set forth in TABLE 4.

TABLE 4

```
<class name= "com.cisco.person"/>
    <identifier name= "SSN"/>
    <label name= "Full_Name"/>
</class>
```

In the example XML annotation above, the XML is instrumented to denote JSON attributes that may be used to generate Dojo-conforming JSON objects, according to an embodiment. For example, the XML annotation above identifies a class 'com.cisco.person' and attributes of the class 'SSN' and 'Full_Name.' The XML annotation also associates the JSON attribute 'identifier' with the 'person' class attribute 'SSN' and the JSON attribute 'label' with the 'person' class attribute 'Full_Name'. Thus, by identifying the 'identifier' and 'label' JSON attributes in this way, the XML annotation may be used to generate a Dojo-conforming JSON object. In an embodiment, using a separate annotation store, such as XML described above, may result in annotations that will work with objects where source code is not available, and may make embodiments described herein applicable to not only fully in-house or open-source artifacts, but also closed-end third party objects that may be provided via binary libraries, such as jars for Java programming language.

The XML annotations referred to above are merely illustrative and should not be construed as limiting the concepts discussed herein as there are many different ways to annotate object attribute declarations using various configuration mechanisms in accordance with the embodiments discussed herein. Further, as previously indicated, the embodiments discussed are not limited to an XML implementation as the annotations discussed above may be made using any configuration mechanism.

3.2 Generating Json Objects

Referring again to FIG. 2, at step 204, a JSON object is generated based upon the base object, according to an embodiment. In an embodiment, JSON object creating unit 126 receives a signal from annotation receiving logic 124 in response to obtaining the annotations. In response, the JSON object is created, for example, in main memory.

In some embodiments, a JSON object may be generated based upon the class definition of the base object using a JSON library, such as JSON-LIB or the GSON library from Google, Inc. In other embodiments, a JSON object may be generated based upon the class definition of the base object using a JSON converter that converts the base object into a Dojo-conforming JSON object according to other embodiments discussed herein. For example, a JSON converter may be implemented that converts a Java class into a Dojo-conforming JSON object rather than generating a standard JSON object that must be modified to be Dojo-conforming according to the embodiments discussed below.

3.3 Retrieving the Annotations

At step 206, at runtime of an executable computer program that has been created using a base object of an object-oriented programming environment, the annotations of the base object may be retrieved, according to an embodiment. In some embodiments, annotations may be retrieved by navigating through the object network of an object-oriented programming environment. In other embodiments, annotations may be retrieved from various configuration mechanisms, such as the XML or property files discussed above. In an embodiment, JSON object header unit 128 is configured to retrieve the annotations from annotation store 122.

In an embodiment, annotations may be retrieved by reading a plurality of base objects according to a recursive search order that iteratively reads all fields of a current class, a super class of the current class when the super class is present, and all non-primitive fields of the current class. However, objects native to the object-oriented programming environment may not be searched for annotations because developers may not have access to modify the class definitions of those objects. For example, annotations may be retrieved by first searching the current class object, i.e., the object to be converted into a JSON object.

After such retrieval, the properties of the current class may be searched followed by a search of any of the direct or indirect super classes. For example, annotations can be inherited by subclasses. Next, annotations may be retrieved by searching any of the classes enclosed in the current class. For example, a class may have attributes that are of a type defined by another class. Then, any of the direct or indirect super classes of the class objects enclosed in the current class may be searched for annotations. Finally, any of the properties of the class objects enclosed in the current class may be searched for annotations. If no annotations are found, an error may be reported.

In other embodiments, annotations may be retrieved from configuration mechanisms associated with base objects according to the recursive search order described in the preceding paragraph.

According to an embodiment, once the annotations are retrieved, the attribute declarations corresponding to the annotations may be associated with the JSON attributes to be consumed by the Dojo function library. For example, the 'oid' attribute of the Java class described above may be associated with the 'identifier' JSON attribute because the 'oid' attribute has been annotated with the @JsonIdentifier annotation. Similarly, the 'deviceName' attribute of the Java class described above may be associated with the 'label' JSON attribute required by the Dojo function library because the 'deviceName' attribute has been identified as corresponding to the @JsonLabel annotation. Hence, the identifier attribute of the JSON object may be assigned the 'oid' string and the label attribute of the JSON object may be assigned the 'deviceName' string, according to the example.

3.4 Generating the Json Header

At step 208 of FIG. 2, a JSON header including the JSON attributes compatible with the Dojo function library is generated, according to an embodiment. In an embodiment, JSON object header unit 128 receives a signal from JSON object creating unit and generates the JSON header in the manner now described.

In an embodiment, the base object attribute declarations denoted by the annotations described above may be analyzed to determine whether the attribute declarations declare attributes of a type that may be used as JSON attributes. For example, the attribute type may be any type that can be encoded as a string, such as integers, strings, or various kinds of scalar values. In some embodiments, a JSON header may be generated to include name-value pairs corresponding to annotated attribute declarations that may be consumable by Dojo widgets. For example, an identifier name-value pair may include the string 'identifier' as the name and a class attribute denoted by an annotation as the value. Thus, in the Java example above, the identifier name-value pair may be represented by the string "'identifier': 'oid'" and the header may be represented by the string "'identifier':'oid', 'label': 'deviceName'"

In one embodiment, a JSON header may be defined as the data contained in a JSON object instructing a Dojo widget how to map key pieces of data to its internal data store. For example, a JSON header may be illustrated by the structure shown in TABLE 5, where the 'identifier' and 'label' attributes comprise the JSON header information.

TABLE 5

{
  'identifier':'oid',
  'label':'deviceName',
  'items':
    [
      {

TABLE 5-continued

"oid":"{[ManagedElement(Key\u003dana-dev-3400-1)]}",
"deviceName":"ana-dev-3400-1",
...

If the above JSON object is used to drive a Dojo ComboBox widget, then the 'oid' of each object contained in the items collection will be used as the item value and 'deviceName' the item label. By using a JSON header, the JSON object may be consumed directly by the Dojo ComboBox widget. Additionally, the use of the JSON headers described herein may also make it possible for other Dojo widgets to consume JSON objects. For example, other annotations may be made to generate additional or different JSON attributes in the JSON header to allow the JSON object to be consumed by other Dojo widgets.

3.5 Modifying the JSON Object

At step 210 of FIG. 2, the JSON object may be modified to include the JSON header generated at step 208, according to an embodiment. In one embodiment, JSON object header unit 128 signals JSON object modifying unit 129 to perform modifications as now described. Modifications may comprise reading and writing new text or other data representing the objects stored on a computer-readable storage medium, such as disk storage, so that a state of the disk storage is transformed to reflect the modified objects.

In an embodiment, the JSON object may be modified to include an 'items' attribute. The JSON object may also be modified to include a 'children' attribute, according to some embodiments.

In an embodiment, a JSON header is inserted into a JSON object after the first left bracket ('{') of the JSON object. For example, the JSON object may be data representing a base object of an object-oriented programming environment encoded into a string according to JSON format. The JSON formatted string may begin with a left bracket ('{') indicating the beginning of the JSON object. The JSON header may be inserted into the JSON object by replacing the left bracket ('{') with a concatenation of the left bracket and the generated JSON header ("{'identifier':'oid', 'label':'deviceName',").

In some embodiments, a JSON object may be modified to include an items attribute by replacing the first collection object identifier string with an items identifier string. For example, standard JSON objects may identify collection attributes using any attribute name. For example, in the JSON object set forth in TABLE 6, the first collection attribute is named 'devices'.

TABLE 6

{
  'devices':
    [
      {
        'oid':'1'
      },
      {
        'oid':'2'
      }, ...

However, the Dojo function library may provide that the first collection attribute shall be named 'items'. Hence, in an embodiment, the first collection attribute may be renamed 'items' to conform to the Dojo API.

In an embodiment, a JSON object may be modified to include a child attribute by replacing a second collection object identifier string with a children identifier string. For example, the 'devices' collection described above may contain other collections such as a collection of ports for each device. However, the Dojo API may only allow one 'items' attribute label and that label may be reserved for the first collection object. Consequently, the Dojo API may require that all other collection attributes be named 'children'. Hence, a collection of 'items' may contain collections of 'children'. Therefore, in an embodiment, JSON collection attributes other than the first collection attribute may be renamed 'children' to conform to the Dojo API.

In some embodiments, server 104 may be configured with object transform logic 120 so that the JSON data transfer objects 114 are prepared in a Dojo compatible form at computer 102 before transport over RESTful web services 112 to the application 108. In some embodiments, the methods described herein may be performed by a server computer configured for network communication with a client computer, at runtime of an executable computer program that has been created using the base object, and without modification of client-side script code that has been delivered to the client computer by the server computer.

TABLE 7 illustrates an example JSON object generated by the GSON library, for reference and background purposes. TABLE 8 illustrates an example JSON object that is consumable directly by Dojo widgets, and which may be generated by an embodiment of the techniques herein. TABLE 9 illustrates an example Dojo grid widget.

TABLE 7

```
{
    "devices":
        [
            {
                "oid":"{[ManagedElement(Key\u003dana-dev-
                3400-1)]}",
                "deviceName":"ana-dev-3400-1",
                "type":"CISCO CATALYST ME-3400G-12CS-A",
                "ip":"172.25.87.135",
                "softwareVersion":"12.2(40)SE",
                "communicationStateEnum":"3"
            },
            {
                "oid":"{[ManagedElement(Key\u003dana-dev-
                7606-1)]}",
                "deviceName":"ana-dev-7606-1",
                "type":"Cisco 7606",
                "ip":"172.25.87.145",
                "softwareVersion":"12.2(33)SRC3",
                "communicationStateEnum":"3"
            },
            {
                "oid":"{[ManagedElement(Key\u003dana-dev-
                7609-2)]}",
                "deviceName":"ana-dev-7609-2",
                "type":"Cisco 7609",
                "ip":"172.25.87.147",
                "softwareVersion":"12.2(33)SRB1",
                "communicationStateEnum":"3"
            },
            {
                "oid":"{[ManagedElement(Key\u003dana-dev-
                7606-2)]}",
                "deviceName":"ana-dev-7606-2",
                "type":"Cisco 7606",
                "ip":"172.25.87.148",
                "softwareVersion":"12.2(33)SRB1",
                "communicationStateEnum":"3"
            }
        ]
}
```

TABLE 8

```
*JSON Object (accessible from /rest/devices):
{
    'identifier':'oid',   <--JSON Header: attributes required by Dojo
    Data Store
    'label':'deviceName',
    'items':
    [
            {
                "oid":"{[ManagedElement(Key\u003dana-dev-3400-1)]}",
                "deviceName":"ana-dev-3400-1",
                "type":"CISCO CATALYST ME-3400G-12CSA",
                "ip":"172.25.87.135",
                "softwareVersion":"12.2(40)SE",
                "communicationStateEnum":"3"
            },
            {
                "oid":"{[ManagedElement(Key\u003dana-dev-7606-1)]}",
                "deviceName":"ana-dev-7606-1",
                "type":"Cisco 7606",
                "ip":"172.25.87.145",
                "softwareVersion":"12.2(33)SRC3",
                "communicationStateEnum":"3"
            },
            {
                "oid":"{[ManagedElement(Key\u003dana-dev-7609-2)]}",
                "deviceName":"ana-dev-7609-2",
                "type":"Cisco 7609",
                "ip":"172.25.87.147",
                "softwareVersion":"12.2(33)SRB1",
                "communicationStateEnum":"3"
            },
            {
                "oid":"{[ManagedElement(Key\u003dana-dev-7606-2)]}",
                "deviceName":"ana-dev-7606-2",
                "type":"Cisco 7606",
                "ip":"172.25.87.148",
                "softwareVersion":"12.2(33)SRB1",
                "communicationStateEnum":"3"
            }
    ]
}
```

TABLE 9

```
*Dojo Grid Widget:
<div dojoType="dojo.data.ItemFileReadStore"
    jsId="wishStore" url="/rest/devices">   <--Consumed directly by
    Dojo Widget
</div>
<table id="grid"
    dojoType="dojox.grid.Grid"
    store="wishStore"
    query="{ oid: '*' }"
    clientSort="true"
    style='width:98%;height:210px;'>
    <thead>
        <tr>
            <th field="oid" width="400px">OID</th>
            <th field="deviceName" width="200px">Device Name</th>
            <th field="type" width="200px">Type</th>
            <th field="ip" width="200px">IP</th>
            <th field="softwareVersion" width="200px">Version</th>
            <th field="communicationStateEnum" width=
            "200px">State</th>
        </tr>
    </thead>
</table>
```

4.0 Implementation Mechanisms—Hardware Overview

Figure 3:
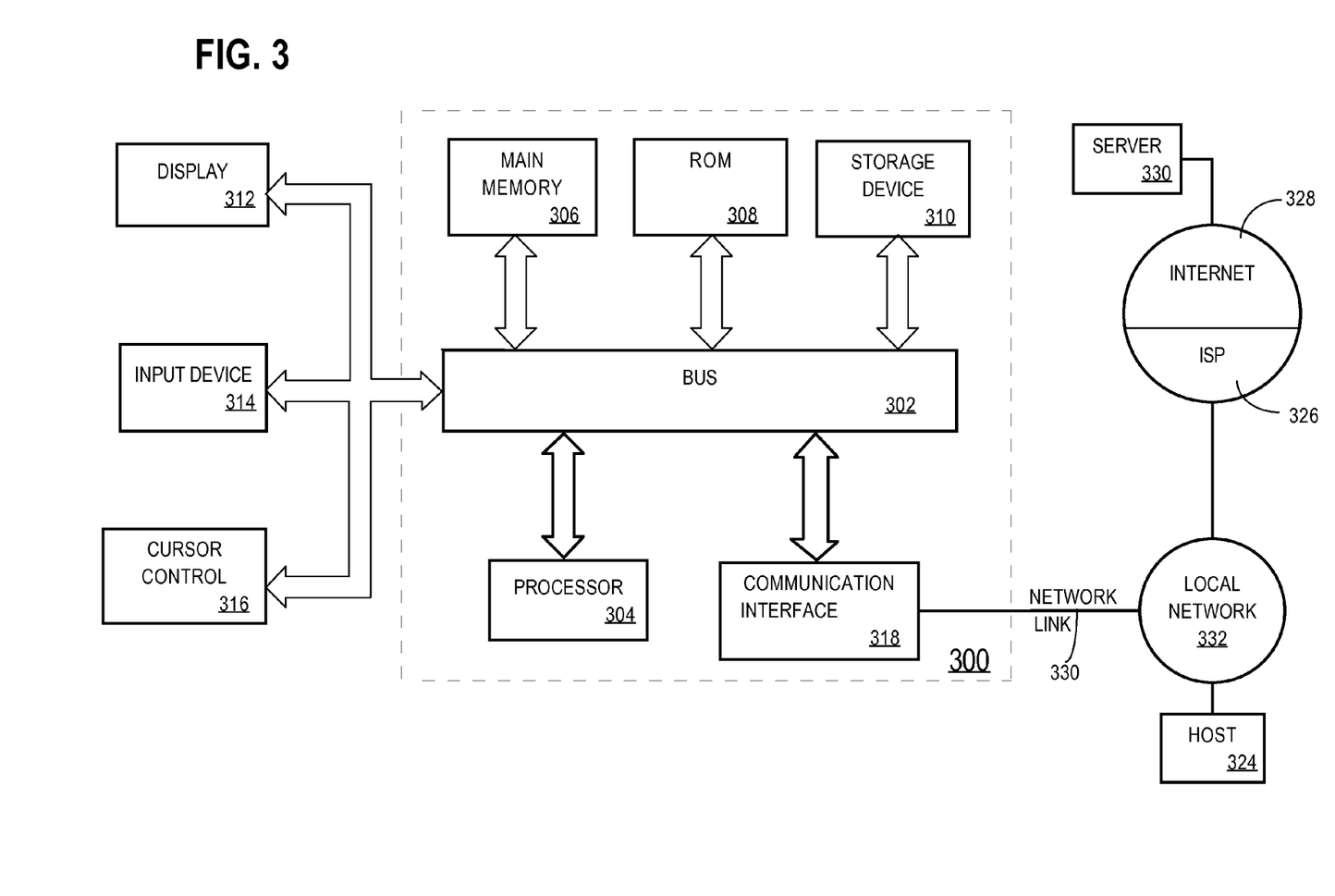
FIG. 3 illustrates a computer system upon which an embodiment may be implemented.

FIG. 3 is a block diagram that illustrates a computer system 300 upon which an embodiment of the invention may be implemented. Computer system 300 includes a bus 302 or other communication mechanism for communicating information, and a processor 304 coupled with bus 302 for processing information. Computer system 300 also includes a main memory 306, such as a random access memory (RAM)

or other dynamic storage device, coupled to bus 302 for storing information and instructions to be executed by processor 304. Main memory 306 also may be used for storing temporary attributes or other intermediate information during execution of instructions to be executed by processor 304. Computer system 300 further includes a read only memory (ROM) 308 or other static storage device coupled to bus 302 for storing static information and instructions for processor 304. A storage device 310, such as a magnetic disk or optical disk, is provided and coupled to bus 302 for storing information and instructions.

Computer system 300 may be coupled via bus 302 to a display 312, such as a cathode ray tube (CRT), for displaying information to a computer user. An input device 314, including alphanumeric and other keys, is coupled to bus 302 for communicating information and command selections to processor 304. Another type of user input device is cursor control 316, such as a mouse, a trackball, or cursor direction keys for communicating direction information and command selections to processor 304 and for controlling cursor movement on display 312. This input device typically has two degrees of freedom in two axes, a first axis (e.g., x) and a second axis (e.g., y), that allows the device to specify positions in a plane.

The invention is related to the use of computer system 300 for implementing the techniques described herein. According to one embodiment of the invention, those techniques are performed by computer system 300 in response to processor 304 executing one or more sequences of one or more instructions contained in main memory 306. Such instructions may be read into main memory 306 from another machine-readable medium, such as storage device 310. Execution of the sequences of instructions contained in main memory 306 causes processor 304 to perform the process steps described herein. In alternative embodiments, hard-wired circuitry may be used in place of or in combination with software instructions to implement the invention. Thus, embodiments of the invention are not limited to any specific combination of hardware circuitry and software.

The terms "machine-readable medium" and "tangible computer-readable medium," "logic" or "computer code" as used herein refers to any medium that participates in providing data that causes a machine to operation in a specific fashion. In an embodiment implemented using computer system 300, various machine-readable media are involved, for example, in providing instructions to processor 304 for execution. Such a medium may take many forms, including but not limited to storage media and transmission media. Storage media includes both non-volatile media and volatile media. Non-volatile media includes, for example, optical or magnetic disks, such as storage device 310. Volatile media includes dynamic memory, such as main memory 306. Transmission media includes coaxial cables, copper wire and fiber optics, including the wires that comprise bus 302. Transmission media can also take the form of acoustic or light waves, such as those generated during radio-wave and infra-red data communications. All such media must be tangible to enable the instructions carried by the media to be detected by a physical mechanism that reads the instructions into a machine.

Common forms of machine-readable media include, for example, a floppy disk, a flexible disk, hard disk, magnetic tape, or any other magnetic medium, a CD-ROM, any other optical medium, punchcards, papertape, any other physical medium with patterns of holes, a RAM, a PROM, and EPROM, a FLASH-EPROM, any other memory chip or cartridge, a carrier wave as described hereinafter, or any other medium from which a computer can read.

Various forms of machine-readable media may be involved in carrying one or more sequences of one or more instructions to processor 304 for execution. For example, the instructions may initially be carried on a magnetic disk of a remote computer. The remote computer can load the instructions into its dynamic memory and send the instructions over a telephone line using a modem. A modem local to computer system 300 can receive the data on the telephone line and use an infra-red transmitter to convert the data to an infra-red signal. An infra-red detector can receive the data carried in the infra-red signal and appropriate circuitry can place the data on bus 302. Bus 302 carries the data to main memory 306, from which processor 304 retrieves and executes the instructions. The instructions received by main memory 306 may optionally be stored on storage device 310 either before or after execution by processor 304.

Computer system 300 also includes a communication interface 318 coupled to bus 302. Communication interface 318 provides a two-way data communication coupling to a network link 320 that is connected to a local network 322. For example, communication interface 318 may be an integrated services digital network (ISDN) card or a modem to provide a data communication connection to a corresponding type of telephone line. As another example, communication interface 318 may be a local area network (LAN) card to provide a data communication connection to a compatible LAN. Wireless links may also be implemented. In any such implementation, communication interface 318 sends and receives electrical, electromagnetic or optical signals that carry digital data streams representing various types of information.

Network link 320 typically provides data communication through one or more networks to other data devices. For example, network link 320 may provide a connection through local network 322 to a host computer 324 or to data equipment operated by an Internet Service Provider (ISP) 326. ISP 326 in turn provides data communication services through the world wide packet data communication network now commonly referred to as the "Internet" 328. Local network 322 and Internet 328 both use electrical, electromagnetic or optical signals that carry digital data streams. The signals through the various networks and the signals on network link 320 and through communication interface 318, which carry the digital data to and from computer system 300, are exemplary forms of carrier waves transporting the information.

Computer system 300 can send messages and receive data, including program code, through the network(s), network link 320 and communication interface 318. In the Internet example, a server 330 might transmit a requested code for an application program through Internet 328, ISP 326, local network 322 and communication interface 318.

The received code may be executed by processor 304 as it is received, and/or stored in storage device 310, or other non-volatile storage for later execution. In this manner, computer system 300 may obtain application code in the form of a carrier wave.

5.0 Extensions and Alternatives

In the foregoing specification, embodiments of the invention have been described with reference to numerous specific details that may vary from implementation to implementation. Hence, no limitation, element, property, feature, advantage or attribute that is not expressly recited in a claim should limit the scope of such claim in any way. The specification and drawings are, accordingly, to be regarded in an illustrative rather than a restrictive sense.

What is claimed is:

1. A computer-implemented method comprising:
obtaining and storing one or more annotations that annotate one or more attribute declarations of a base object of an object-oriented programming environment, wherein the one or more annotations denote one or more JavaScript Object Notation (JSON) attributes;
at runtime of an executable computer program that has been created using the base object:
generating a JSON object based upon the base object;
retrieving the annotations;
creating a JSON header that comprises the annotations in a format compatible with a function library that expects name-value pair declarations;
attaching the JSON header to the JSON object;
renaming an attribute of the JSON object to an items attribute;
wherein at least the generating, creating and renaming are performed by one or more processors.

2. The method of claim 1, wherein obtaining and storing the one or more annotations comprises receiving and storing class definitions of classes of an object-oriented programming environment, including receiving and storing each annotation in association with a corresponding attribute declaration statement of the classes.

3. The method of claim 1, wherein obtaining and storing the one or more annotations comprises receiving and storing a configuration file that comprises a class name, and one or more tags, each tag associating a name of a class attribute used in the class with a JSON attribute.

4. The method of claim 1, wherein the object-oriented programming environment is any of .NET, Java, C#, SmallTalk, Objective-C, or C++.

5. The method of claim 1, wherein obtaining the annotations comprises reading a plurality of base objects according to a recursive search order that iteratively reads all fields of a current class, a superclass of the current class when the superclass is present, and one or more non-primitive fields of the current class.

6. The method of claim 1, wherein the function library is a Dojo compatible function library.

7. The method of claim 1, wherein creating the JSON header comprises determining whether the one or more attribute declarations declare attributes of a type that can be used as JSON attribute values; generating the JSON header to include one or more name-value pairs corresponding to the one or more annotated attribute declarations.

8. The method of claim 1, wherein attaching the JSON header to the JSON object comprises inserting the JSON header after a first left bracket ('{') in the JSON object.

9. The method of claim 1, wherein modifying the JSON object to include an items attribute comprises replacing a first collection object identifier string in the JSON object with an items identifier string.

10. The method of claim 1, further comprising modifying the JSON object to include a child attribute by replacing a second collection object identifier string in the JSON object with a children identifier string.

11. The method of claim 1, wherein the method is performed by a server computer configured for network communication with a client computer, at runtime of an executable computer program that has been created using the base object, and without modification of client-side script code that has been delivered to the client computer by the server computer.

12. A machine-readable storage medium storing one or more sequences of instructions which, when executed by one or more processors, cause performing:
obtaining and storing one or more annotations that annotate one or more attribute declarations of a base object of an object-oriented programming environment, wherein the one or more annotations denote one or more JavaScript Object Notation (JSON) attributes;
at runtime of an executable computer program that has been created using the base object:
generating a JSON object based upon the base object;
retrieving the annotations;
creating a JSON header that comprises the annotations in a format compatible with a function library that expects name-value pair declarations;
attaching the JSON header to the JSON object;
renaming an attribute of the JSON object to an items attribute;
wherein at least the generating, creating and renaming are performed by one or more processors.

13. The machine-readable storage medium of claim 12, wherein the instructions that cause obtaining and storing the one or more annotations comprise the instructions that cause receiving and storing class definitions of classes of an object-oriented programming environment, including receiving and storing each annotation in association with a corresponding attribute declaration statement of the classes.

14. The machine-readable storage medium of claim 12, wherein the instructions that cause obtaining and storing the one or more annotations comprise the instructions that cause receiving and storing a configuration file that comprises a class name, and one or more tags, each tag associating a name of a class attributes used in the class with a JSON attribute.

15. The machine-readable storage medium of claim 12, wherein the instructions that cause retrieving the annotations comprise the instructions that cause reading a plurality of base objects according to a recursive search order that iteratively reads all fields of a current class, a superclass of the current class when the superclass is present, and all non-primitive fields of the current class.

16. The machine-readable storage medium of claim 12, wherein the function library is a Dojo function library.

17. The machine-readable storage medium of claim 12, wherein the instructions that cause creating the JSON header comprise the instructions that cause determining whether the one or more attribute declarations declare attributes of a type that can be used as JSON attribute values; generating the JSON header to include one or more name-value pairs corresponding to the one or more annotated attribute declarations.

18. An apparatus comprising:
one or more processors;
object transform logic configured for generating a JavaScript Object Notation (JSON) object, comprising:
annotation receiving logic configured to receive and store one or more annotations that annotate one or more attribute declarations of a base object of an object-oriented programming environment, wherein the one or more annotations denote one or more JavaScript Object Notation (JSON) attributes;
a JSON object creating unit configured to generate, at runtime of an executable computer program that has been created using the base object, a JSON object based upon the base object;
a JSON object header unit configured to retrieve the annotations and to create creating a JSON header that comprises the annotations in a format compatible with a function library that expects name-value pair declarations and to attach the JSON header to the JSON object;

a JSON object modifying unit configured to rename an attribute of the JSON object to an items attribute.

19. The apparatus of claim 18, wherein the annotation receiving logic is further configured to receive and store class definitions of classes of an object-oriented programming environment, by obtaining and storing each annotation in association with a corresponding attribute declaration statement of the classes.

20. The apparatus of claim 18, wherein the annotation receiving logic is further configured to receive and store the one or more annotations by obtaining and storing a configuration file that comprises a class name, and one or more tags, each tag associating a name of a class attributes used in the class with a JSON attribute.

21. The apparatus of claim 18, wherein the annotation receiving logic is further configured to receive and store the annotations by reading a plurality of base objects according to a recursive search order that iteratively reads all fields of a current class, a superclass of the current class when the superclass is present, and all non-primitive fields of the current class.

22. The apparatus of claim 18, wherein the function library is Dojo.

23. The apparatus of claim 18, wherein the JSON object header unit is further configured to determine whether the one or more attribute declarations declare attributes of a type that can be used as JSON attribute values; and generate the JSON header to include one or more name-value pairs corresponding to the one or more annotated attribute declarations.

* * * * *